United States Patent Office 3,125,453
Patented Mar. 17, 1964

3,125,453
WAX POLISH CONTAINING HEXAMETHYLENE
TETRAMINE
Milton R. Simonds, Bainbridge, N.Y., assignor to The
Borden Company, New York, N.Y., a corporation of
New Jersey
No Drawing. Filed June 25, 1962, Ser. No. 205,122
9 Claims. (Cl. 106—10)

This invention relates to a polishing composition.

The invention is particularly useful in making polishes for floors, floor tile, furniture, shoes or other leather goods and will be illustrated by description in connection therewith.

The hazard of slipping on a waxed wood, linoleum or tile floor has long been a problem for the manufacture of the polishes used. Also there has been constant effort to improve the gloss of polish from shoes and other articles.

The present invention, by a modification of conventional polishes of these classes, decreases the slipperiness of the film and increases the luster of the polish.

Briefly stated, the invention comprises a conventional wax polish and hexamethylenetetramine, commonly called "hexa," incorporated as antislip agent into the composition. In one embodiment the polish is an aqueous emulsion and the hexa is dissolved in the aqueous phase. In a modification, the hexa is dispersed as a powder in the paste type composition or may be dispersed therein as water-in-oil emulsion of a nearly saturated solution of hexa.

The wax used is any that is a non-solvent for the hexa and conventional for the class of polishing composition being made as, for example, carnauba, beeswax blended with ozokerite, ceresin, paraffin, candellila, montan, curi-curi, shellac wax, sugar cane wax, microcrystalline, and Fischer-Tropsch wax or mixtures of two or more of such waxes. The Fischer-Tropsch wax is a product derived from the reaction of carbon monoxide and hydrogen under pressure and in contact with catalyst in the well known process. The grade of such synthetic paraffin used is a hard variety (sometimes called Fischer-Tropsch paraffin), such as one of melting point 102–108° C. and described as "multipurpose synthetic emulsifiable hard waxes derived from the Fischer-Tropsch process."

The wax may be further modified by the inclusion of synthetic high polymers such as polyethylene, polystyrene, and other vinyl polymers and copolymers that are compatible with the wax.

When the polish is an aqueous emulsion or dispersion, we use any emulsifying agent now employed in such compositions, e.g., the sodium salt of a higher fatty acid constituting a usual type of soap, a synthetic detergent of which examples are potassium lauryl sulfate, sodium dodecyl benzene sulfate, alkanolamides of fatty acids, polyoxyethylated alcohols and phenols, or salts of palmitic, oleic, stearic, or lauric acid with any of the water-soluble amines, of which mono-, di-, and triethanolamine, morpholine, piperazine, diethylene triamine, and tetraethylene pentamine are examples.

As the dispersion medium for the wax, I use a volatile liquid that is a non-solvent for the wax such as water, when the polishing composition is to be an emulsion, and a solvent for the wax when the polish is a paste. Examples of such solvents are petroleum naphthas of distillation range about 120°–200° C., turpentine, nitrobenzene, xylene, and dipentene.

Emulsification or stabilization of the emulsions is promoted when necessary by the introduction of a small proportion of alkali as, for instance, sodium or potassium carbonates or hydroxides or a water-soluble amine in aqueous solution and in amounts, if any, to establish the desired pH.

Hexamethylenetetramine is the antislip and luster improving agent, as in the commercial form known as hexa.

As to proportions, the hexamethylenetetramine is in the amount of about 10–80 parts and for best results about 15–60 parts for 100 parts of wax or waxes in the polish.

Emulsifying agents when used, as in the aqueous emulsion, are in amounts that are usual for the selected agent in providing necessary surface tension lowering and giving the desired emulsification. These amounts may vary, as from about 0.1%–20% of the weight of the wax.

Dyes that are commonly used in the polishes are incorporated, in kind and amount to establish the color desired.

When the polish is in the form of an emulsion of oil or wax in water as in the case of a floor polish, the proportion of water is usually greater than that of the wax fraction of the polish, e.g., 100–800 parts of water for 100 of the wax.

In compounding the polishes, technique and equipment that are conventional in the art are employed, with the exception of the introduction of the hexa. Thus in making an aqueous emulsified floor polish, the waxes, the emulsifying agent or agents, alkali if any, hexa, dye, and water are mixed thoroughly by vigorous agitation and warmed to a temperature at which the wax or waxes present become melted, the stirring continued until the emulsion is completed, and the resulting product then cooled. In making a shoe polish paste, the ingredients are compounded by gentle stirring and heating as to about 90° C. The resulting solution of the wax and components soluble therein form a liquid phase. The hexa is admixed in fine powdered form such as 270-mesh or finer or as a concentrated aqueous solution that is emulsified in the wax solution as a water in oil emulsion. The resulting suspension of the hexa is then cooled to a temperature slightly above that at which the wax phase solidifies, transferred to the containers for final distribution, and then cooled to room temperature, so that solidification occurs in the said containers. The dispersion is so thorough that the hexa is not visible in the final colored shoe polish.

The invention is further illustrated by description in connection with the following specific examples, proportions here and elsewhere herein being expressed as parts by weight.

*Example 1*

Floor polish was made of the following formula:

| Component: | Parts by weight |
|---|---|
| Synthetic (Fischer-Tropsch) hard wax, M.P. 105° C. | 10 |
| Paraffin wax | 10 |
| Oleic acid } Emulsifying composition | 1 |
| Triethanolamine } | 1 |
| Sodium carbonate (soda ash) | 3 |
| Water | 80 |

Into this base formula hexamethylenetetramine was incorporated in varying amounts, namely 3, 6 and 9 parts for 100 parts of the polish, dissolved in the aqueous phase thereof, but omitted entirely in a control sample. The compositions so made were heated to approximately 90° C. and agitated vigorously to emulsify the various materials.

The product is suitable for application to smooth wooden surfaces of furniture or floors, linoleum or polyvinyl chloride floor tile having an asbestos cloth backing, to produce on drying a film of good luster and antislip property.

The antislip feature was tested quantitatively by weighting a new vegetable-tanned men's leather shoe sole lying flat on a dry film of the polish on a vinyl floor tile in horizontal position. Then one edge of the floor tile was raised at a predetermined and uniform rate until the angle of slip (angle of repose) was determined. This was the angle made between the polished surface and the floor at the time the shoe sole first began to slip down the incline.

The results of this test, in terms of the angle at which the slipping began, are shown in the following table.

| Hexa, lbs. | Antislip Angles for Wax Polish After— | | |
|---|---|---|---|
| | First buffing, degrees | Second buffing, degrees | Third buffing, degrees |
| 0 | 28.7 | 28.7 | 27.0 |
| 3 | 29.0 | 31.0 | 29.9 |
| 6 | 31.5 | 30.4 | 31.0 |
| 9 | 30.3 | 28.7 | 29.3 |

Also, a tan-colored polyvinyl chloride floor tile was coated with the same series of polishes, dried and buffed three times. The antislip angles now were 26.6°, 29.3°, 30.0°, and 30.3°, respectively.

The explanation of the exact mechanism by which hexa gives antislip properties to floor wax polish is not evident. There is noted, however, the solubility of the hexa in the aqueous phase of the polish and the insolubility of the hexa in the wax.

The film is heterogeneous and the hexa phase is considered to provide a thin barrier to the contact of the leather sole with the wax proper, to interrupt the continuity of surface. The hexa separated from wax must be of fine structure, however, and not of coarse granulation, as shown by the hardening effect of the hexa on the wax film and retention or actual improvement of the specular gloss of it.

Scratch hardness values, using the knife plow instrument of Harry W. Dietert Co. on the films of the composition shown in the table above were: 95, 98, 98, and 98 for the hexa content 0%, 3%, 6%, and 9%, respectively, the scale of hardness of this instrument being arbitrary and based on 100 for plate glass.

Shore hardness values, representing resistance to indentation of a sharp point, for the same materials were 96, 97, 97, and 98, respectively.

Specular gloss values obtained on a Photovolt Reflectance Meter, Model 610, were as follows:

| Hexa, lbs. | Gloss Values on Wax Polish Films on Vinyl Title After— | | |
|---|---|---|---|
| | First buffing | Second buffing | Third buffing |
| No wax (bare tile) | 66 | 66 | 66 |
| Wax, no hexa | 82 | 84 | 83 |
| Wax, 3 lbs. hexa | 87 | 89 | 89 |
| Wax, 6 lbs. hexa | 87 | 90 | 90 |
| Wax, 9 lbs. hexa | 88 | 89 | 90 |

The inclusion of hexa with the polishing type of wax enhances the slip resistance, hardness and response of the wax film to buffing.

*Example 2—Paste Shoe Polish*

The first observation made on leather shoes came from accidentally spilling hexa solution in water on a shoe and noting the abnormally high luster attained on wiping and buffing this shoe. Hexa was then added purposely to a commercial shoe polish paste and the buffing characteristics noted, as follows:

Gms.
Shoe wax polish _____ 40
Hexa added _____ 2.4

The wax polish was warmed to a liquid state and finely ground hexa (270-mesh) was uniformly blended in. The mix was allowed to cool and solidify.

Two pairs of men's shoes were used for tests on visual observation for difference in luster after applications of number shown. The left shoe was treated with the polish into which 6% of hexa had been compounded as described. The polish with no hexa added was used as a control on the right shoe.

TEST NO. 1

| Application | Left Shoe-Wax Plus Hexa | Right Shoe-Control-Wax Only |
|---|---|---|
| 1st | Good luster | Not as bright as left shoe. |
| 2nd | Luster improved | Do. |
| 3rd | ----do---- | Do. |

TEST NO. 2

| | | |
|---|---|---|
| 1st | Poor luster | Poor luster. |
| 2nd | Luster improved | Less luster than left shoe. |
| 3rd | Good luster | Do. |

*Example 3—Liquid Shoe Polish*

Hexa was then added to a liquid shoe polish as follows:

Grams
Liquid shoe polish _____ 50
Hexa (44% solution in water) _____ 14

One pair of shoes was used for tests using visual observation for difference in luster.

| Application | Control Polish—No hexa | Polish plus Hexa |
|---|---|---|
| 1st | Luster dulled with age | Maintained its luster. |
| 2nd | Good luster | Improved luster upon application. |
| 3rd | ----do---- | Do. |
| 4th | ----do---- | Better surface before application. |
| 5th | ----do---- | Improved luster after application. |

It was noted also that the test polish including the hexa improved the "feel" of the leather.

*Example 4*

A shoe polish in the form of anhydrous paste is made as follows:

Fifteen parts of carnauba wax, 10 parts of paraffin, 5 of ceresin, 67.5 of a mixture of approximately equal proportions of turpentine and high boiling naphtha of kind described, and 2 parts of powdered hexa of fineness to pass to the extent at least 95% through 270 mesh are stirred gently and heated in a steam jacketed kettle to a temperature within the range 80°–95° C. One-half part of nigrosine or other black dye is then introduced in powder form and stirred in, until the dye is completely dispersed. The resulting liquid mass is partly cooled, filled into containers, and then cooled further to room temperature, to cause solidification.

The product so made is satisfactory as shoe polish. Although the hexa is not soluble in the wax composition, it does not interfere with but actually improves the luster.

*Example 5*

Each of the waxes disclosed above are introduced, separately and in turn, in the amount of 30 parts by weight in place of the carnauba, paraffin and ceresin waxes in Example 4 and compounding and processing completed exactly as described.

*Example 6*

A floor polish is made of the following formula:

Parts
Carnauba wax _____ 20
Triethanolamine oleate _____ 2
Sodium carbonate _____ 3
Wax _____ 80
Hexamethylene tetramine _____ 6

Compounding is effected as described in Example 1.

The products of the several examples meet the requirement for antislip effect and lustre.

It will be understood that it is intended to cover all changes and modifications of the examples of the invention herein chosen for the purpose of illustration which do not constitute departures from the spirit and scope of the invention.

I claim:

1. In a polishing composition comprising an emulsion of a polish wax and an emulsifying agent in a volatile liquid medium, the improvement comprising hexamethylenetetramine admixed as antislip agent and dispersed in said emulsion in the amount of about 10–80 parts by weight of the hexamethylene tetramine for 100 parts of the wax, the wax being a non-solvent for hexamethylenetetramine, being in proportion above half the weight of non-volatile material in said composition, and being selected from the group consisting of carnauba, beeswax blended with ozokerite, ceresin, paraffin, candellila, montan, curicuri, shellac, sugar cane, microcrystalline, and synthetic paraffin wax of melting point at least about 102° C. and mixtures of such waxes.

2. The composition of claim 8, said emulsifying agent being a mixture in equal proportions of oleic acid and triethanolamine.

3. The composition of claim 1, said composition being in the form of a paste and said medium being a volatile organic liquid.

4. The polish of claim 1, said wax being a mixture of carnauba and paraffin waxes.

5. The polish of claim 1, said wax being candellila.

6. The composition of claim 3, said organic liquid being a mixture in approximately equal proportions by weight of turpentine and a petroleum naphtha of boiling range about 120°–200° C.

7. The composition of claim 3, said organic liquid being selected from the group consisting of petroleum naphtha of boiling range about 120°–200° C., turpentine, nitrobenzene, xylene and dipentene and mixtures thereof.

8. The composition of claim 1, said liquid medium being water.

9. The composition of claim 1, said wax being carnauba.

References Cited in the file of this patent

Glickman: "Wax Emulsion Polishes," Chemical Industries, January 1944, vol. 29, pp. 106–10.

UNITED STATES PATENT OFFICE
CERTIFICATE OF CORRECTION

Patent No. 3,125,453                            March 17, 1964

Milton R. Simonds

It is hereby certified that error appears in the above numbered patent requiring correction and that the said Letters Patent should read as corrected below.

Column 3, line 45, for "materiales" read -- materials --; same column 3, second table, second heading thereof, for "Title" read -- Tile --; column 4, line 74, for "Wax" read -- Water --.

Signed and sealed this 6th day of October 1964.

(SEAL)
Attest:

ERNEST W. SWIDER
Attesting Officer

EDWARD J. BRENNER
Commissioner of Patents